A. H. NORTH.

Lamp.

No. 4,284. Reissued Feb. 28, 1871.

Rufus S. Merrill
assignee of Albert H. North
by atty A. Pollok

WITNESSES W. Bailey
C. B. Nottingham

N. PETERS, Photo-Lithographer, Washington, D. C.

United States Patent Office.

ALBERT H. NORTH, OF HARTFORD, CONNECTICUT, ASSIGNOR TO RUFUS S. MERRILL SAID MERRILL ASSIGNS TWO-THIRDS OF HIS RIGHT TO WILLIAM B. MERRILL AND JOSHUA MERRILL, OF BOSTON, MASSACHUSETTS.

Letters Patent No. 23,483, dated April 5, 1859; reissue No. 4,284, dated February 28, 1871.

IMPROVEMENT IN LAMPS.

The Schedule referred to in these Letters Patent and making part of the same.

*To whom it may concern:*

Be it known that I, ALBERT H. NORTH, of the city of Hartford, county of Hartford and State of Connecticut, have invented a new and useful Improvement in the Mode of Regulating and Adjusting or Raising and Lowering Lamp-Wicks; and I do hereby declare that the following is a full, clear, and correct description thereof, reference being made to the accompanying drawing and to the letters of reference marked thereon.

My invention relates to lamps in which either circular or flat wicks are used; and It consists in the employment of ratchet or spur-wheels arranged to impinge upon or engage with the wick or wicks, and geared together, substantially as hereinafter described, so that no one wheel can move independently of the others, but all must revolve simultaneously, thereby acting in unison upon the wick or wicks for the purpose of raising or lowering the same.

To enable those skilled in the art to understand and use my invention, I will proceed to describe the manner in which the same is or may be carried into effect.

My invention is applicable to various kinds of lamps, but is particularly adapted for use in lamps having a round wick.

In applying the invention to a lamp having an annular wick-tube—an Argand burner, for instance—I place around the exterior of the wick-tube a suitable number of ratchets or wick-raising wheels, which are arranged to revolve in a vertical plane, and extend through apertures in the wick-tube far enough to engage with the wick therein.

As it is important that the wheels should all revolve simultaneously, so that the wick may be carried up or down in the tube, by their combined and united movement, evenly and securely, I connect them together, by means of suitable gearing, in such a manner that no one wheel can move independently of the others, but all must move in concert, the gearing being the medium through which this movement is imparted and maintained.

By connecting the gearing with a wick-raising stem or shaft projecting from the burner, like the wick-raising shaft with milled head in ordinary flat-wick burners, the whole series of ratchets may be simultaneously put in motion by turning the stem, and the wick can thus be readily and easily adjusted.

The utility of this arrangement for raising and lowering the wicks of all kinds of lamps is manifest. Whether there be one wick or several, and whether the wick be flat or round, the wick-raising devices will still operate to effect the adjustment as above explained.

In the accompanying drawing I have represented the manner in which the ratchets may be thus geared together and arranged for simultaneous and concerted action.

Around the annular wick-tube C, of the burner, I arrange a series of ratchet or wick-raising wheels, G, four in this instance, at equal distances apart, mounting them upon axes supported in standards at a suitable height above the collar or base B of the burner.

The wheels engage with the wick through apertures in the wick-tube, and their teeth are made sharp so as to penetrate the wick sufficiently to take a firm hold for the purpose of lifting or lowering it.

Figure 1:
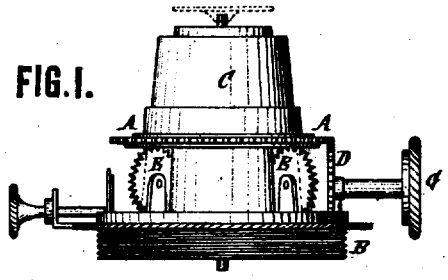
Figure 1 is a side view of an Argand or hollow-wick lamp-burner, embodying the invention.
Figure 2:
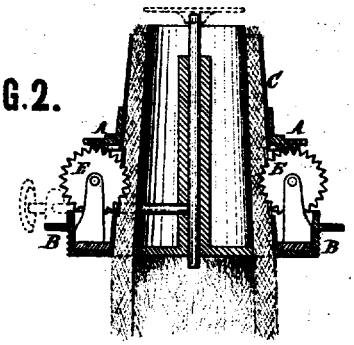
Figure 2 is a vertical section of the same on the line *x x*, fig. 3.
Figure 3:
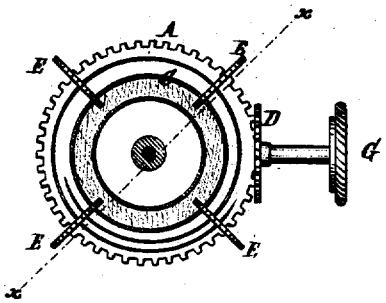
Figure 3 is a view of the burner inverted.

In order to gear together this series of independently-revolving wheels so that they shall move only in unison and together, I mount upon the wick-tube an annular plate, A, upon the under side of which is formed a scroll or worm-tooth, as shown in figs. 2 and 3, with which the teeth of the several wheels engage.

The annular plate or scroll-gear A is so mounted upon the wick-tube as to be capable of rotation thereon, and when it is put in motion it will communicate, through the medium of its scroll-tooth, movement simultaneously to all the wheels, which will, consequently, revolve in unison.

In order to readily operate the scroll-gear A, I form teeth in its periphery, which mesh in with the teeth of a vertical gear, D, attached to the end of a shaft or stem, G, having the usual milled heads, and mounted so as to revolve in suitable bearings on the burner.

By turning the shaft G by means of its milled head, the scroll-gear A, and consequently the wheels E, will at once be put in motion, and the wick will be raised or lowered, according to the direction in which the shaft is revolved.

Having now described my invention, and the manner in which the same is or may be carried into effect,

What I claim, and desire to secure by Letters Patent, is—

The employment in lamp-burners, for the purpose of raising and lowering the wick or wicks therein contained, of two or more ratchet or spur-wheels, arranged to impinge upon or engage with said wick or wicks, and geared to move in unison to effect the raising and lowering of the same, substantially as herein shown and described.

In testimony whereof I have signed my name to this specification before two subscribing witnesses.

ALBERT H. NORTH.

Witnesses:

H. P. GANGLOFF,

GEORGE H. WHITAKER.